United States Patent [19]
Gallagher et al.

[11] Patent Number: 5,564,731
[45] Date of Patent: Oct. 15, 1996

[54] MOTOR VEHICLE INSTRUMENT PANEL WITH FLEXIBLE TETHERING HINGED AIR BAG DEPLOYMENT DOOR

[75] Inventors: Michael J. Gallagher, Hampton; Peter J. Iannazzi, Hampstead, both of N.H.

[73] Assignee: Davidson Textron Inc., Dover, N.H.

[21] Appl. No.: 414,387

[22] Filed: Mar. 31, 1995

[51] Int. Cl.$^6$ ................................................. B60R 21/16
[52] U.S. Cl. ................................ 280/728.3; 280/732
[58] Field of Search ........................ 280/728.1, 728.2, 280/728.3, 731, 732

[56] References Cited

U.S. PATENT DOCUMENTS

| | | | |
|---|---|---|---|
| 4,893,833 | 1/1990 | DiSalvo et al. | 280/732 |
| 4,989,897 | 2/1991 | Takada | 280/743 |
| 5,044,663 | 9/1991 | Seizert | 280/730 |
| 5,096,221 | 3/1992 | Combs et al. | 280/732 |
| 5,158,322 | 10/1992 | Sun | 280/732 |
| 5,161,819 | 11/1992 | Rhodes, Jr. | 280/728 |
| 5,335,939 | 8/1994 | Kuriyama et al. | 280/728.3 |
| 5,348,339 | 9/1994 | Turner | 280/728 |
| 5,407,225 | 4/1995 | Cooper | 280/728.3 |
| 5,458,361 | 10/1995 | Gajewski | 280/732 |

*Primary Examiner*—Paul N. Dickson
*Attorney, Agent, or Firm*—Reising, Ethington, Barnard & Perry

[57] ABSTRACT

A molded motor vehicle instrument panel made of a thermoplastic material has an integral air bag deployment door for a passenger side air bag that is defined by a tear seam and is normally retained by an integral flexible mounting/hinge flange to a part of the vehicle structure when the seam is torn by the inflating air bag and wherein this flange then bends to allow the door to swing open to allow deployment of the air bag through an opening in the instrument panel while retaining same to the vehicle structure as the door is then free of the instrument panel. At very low temperatures, a portion of the air bag door can break away from the mounting/hinge flange because of plastic embrittlement at these low temperatures and the high bending stresses encountered at this juncture. This separation of the broken door portion from the vehicle structure is prevented by a tethering hinge that is formed of a strong flexible sheet material that spans this critical juncture between the mounting/hinge flange and door and remains flexible at these very cold temperatures to retain the broken door portion to the vehicle structure.

10 Claims, 2 Drawing Sheets

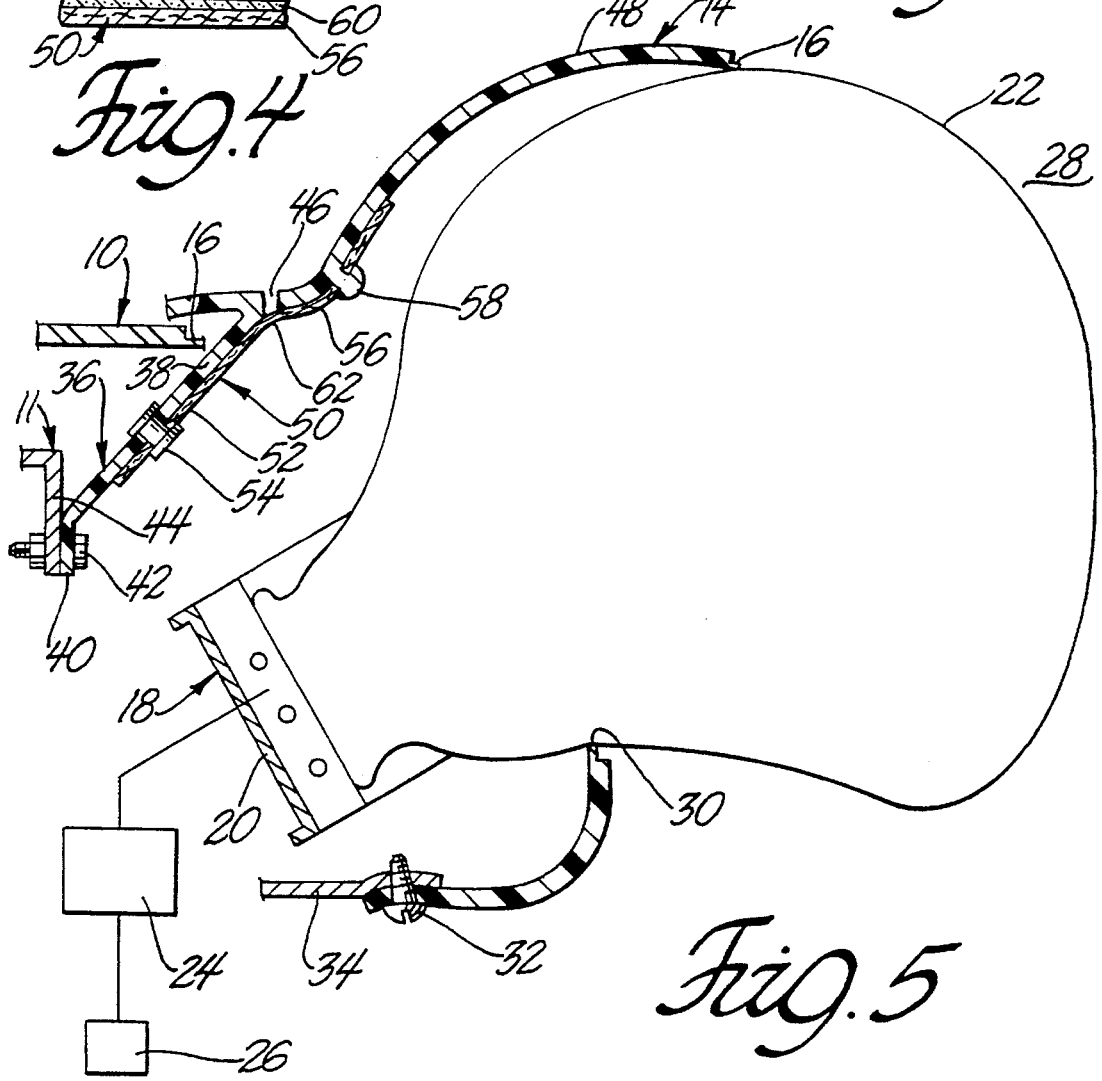

MOTOR VEHICLE INSTRUMENT PANEL WITH FLEXIBLE TETHERING HINGED AIR BAG DEPLOYMENT DOOR

TECHNICAL FIELD

This invention relates to motor vehicle instrument panels having an integral air bag deployment door defined by a tear seam and more particularly to a tether for the air bag door when it is separated at very low temperatures from the instrument panel and then from a flexible hinge that is integral with the door and normally provides for opening swinging movement of the door and its retention to the vehicle structure at higher temperatures,

BACKGROUND OF THE INVENTION

Presently, most passenger side air bag doors are formed in an air bag cover that is separate from the instrument panel because the latter is made of a commercially available thermoplastic material particularly suited to meeting the requirements of its application but is not well suited to meeting the requirements of an air bag door that is defined by a tear seam formed in the instrument panel, For example, the plastics materials used to make a self-supporting instrument panel must have a certain degree of stiffness and high heat resistance to meet the requirements of its application but the materials that are currently available for such an instrument panel do not retain ductility and become embrittled at very low or cold temperatures which is unsuitable for air bag deployment where the air bag door is formed integral with and defined by a tear seam formed in the instrument panel. styrene-maleic anhydride, polypropylene, polycarbonate and polyphenylene oxide are examples of thermoplastic materials that are suitable for the instrument panel but do not have the required ductility for such an air bag door at very low temperatures. As a result, the air bag cover on the passenger side is .normally made separate from the instrument panel and of a different commercially available thermoplastic material such as polyurethane elastomer, polyester elastomer, and polyolefin elastomer which are suitable for such application but are not suitable for the requirements of the instrument panel.

Costs can be reduced, quality can be improved and styling can be enhanced by molding the instrument panel and the air bag cover including an integral air bag deployment door in one piece at the same time out of the same commercially available material. That is provided that the normal material requirements for the instrument panel are not sacrificed while the safe assured operability of the integral air bag deployment door is still somehow retained at reasonable cost even though the plastics material is not well suited thereto.

SUMMARY OF THE PRESENT INVENTION

In the present invention, a molded motor vehicle instrument panel made of a commercially available thermoplastic material well suited for the primary purpose of such a panel has an integral air bag deployment door for a passenger side air bag that is safely retained to the vehicle structure in a very cost effective manner. The air bag door is defined by a tear seam in the panel and is normally retained by an integral flexible mounting/hinge flange to a part of the vehicle structure when the seam is torn by the inflating air bag and wherein this flange which before was integral with both the door and the panel is then separated from the panel while remaining integral with the door and bends to allow the door to swing open to allow deployment of the air bag through an opening in the instrument panel while retaining same to the vehicle structure as the door is then free of the instrument panel. At very low temperatures, a portion of the air bag door can break away from the mounting/hinge flange where it joins therewith because of plastic embrittlement at these low temperatures and the high bending stresses encountered at this juncture. This separation of the broken door portion from the vehicle structure is prevented by a flexible tethering hinge that is fastened so as to span the critical juncture between the flange and the potential break away door portion and is formed of a strong flexible material that remains flexible or ductile to a significant degree at these very cold temperatures.

The flexible tethering hinge is fastened along one margin on one side of the critical juncture zone to a portion of the mounting/hinge flange remote from this potential fracture zone by fastening means such as rivets and is fastened along another margin on the other side of this zone to the inner side of the potential break away door portion by fastening means such as an adhesive or heat staked bosses that can not be observed at the outer side of the door. The tethering hinge has a portion intermediate its margins that spans the potential fracture zone and flexes when door breakage occurs to permit the broken door portion to continue to swing outward to provide for air bag deployment while retaining the broken door portion to the vehicle structure.

It is therefore an object of the present invention to provide a new and improved motor vehicle instrument panel with an integral and tethered air bag deployment door.

Another object is to provide a new and improved motor vehicle instrument panel with an integral and tethered air bag deployment door at low cost and of high quality and to meet certain styling desires.

Another object is to provide a motor vehicle instrument panel having an integral air bag deployment door that is defined by a tear seam in the panel and is retained to the vehicle structure by a flexible tethering hinge in the event the door is separated at very low temperatures from an integral mounting/hinge flange that normally fastens the air bag door to the vehicle structure.

Another object is to provide a motor vehicle instrument panel including an air bag deployment door that is defined by a tear seam in the panel and is retained to the vehicle structure by a flexible tethering hinge formed of flexible sheet material in the event the door is separated at very low temperatures from an integral mounting/hinge flange that normally fastens the air bag door to the vehicle structure.

Another object is to provide a low cost, high quality, motor vehicle instrument panel including an integral and also flexibly tethered air bag deployment door wherein the door is defined by a tear seam in the panel and is retained to the vehicle structure by a flexible tethering hinge formed of flexible sheet material in the event the door is separated at very low temperatures because of cold embrittlement and bending stresses from an integral mounting/hinge flange that normally retains the air bag door to the vehicle structure.

These and other objects, advantages and features of the present invention will become more apparent from the following description and the accompanying drawings wherein:

BRIEF DESCRIPTION OF THE DRAWINGS

FIG. 3 is a view taken along the line 3—3 in FIG. 2 when looking in the direction of the arrows;

FIG. 4 is a view like FIG. 3 but of a much smaller cross section area in larger relative scale and illustrates in an exaggerated manner an adhesive used to fasten the flexible tethering hinge to the air bag door instead of the hot staked rivets shown in FIGS. 2 and 3; and FIG. 5 is a view like FIG. 2 but showing the air bag door opened and broken but retained during the deployment of the air bag at a very low temperature.

DETAILED DESCRIPTION OF THE DRAWINGS

Figure 1:
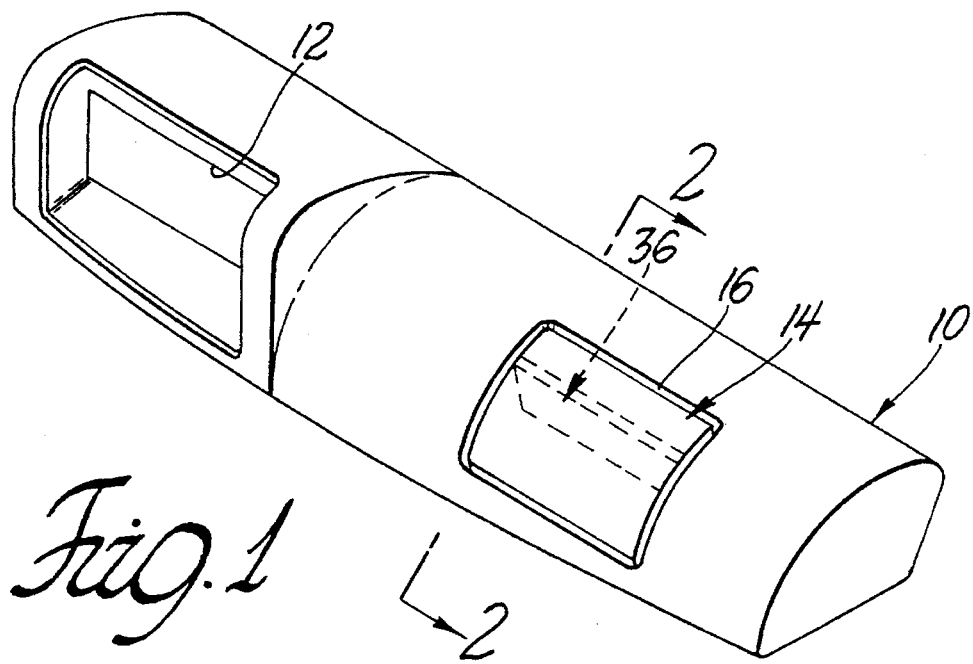
FIG. 1 is a perspective view of a motor vehicle instrument panel including integral air bag deployment door with a flexible tethering hinge according to the present invention and as installed in a motor vehicle over an air bag system.
Figure 2:
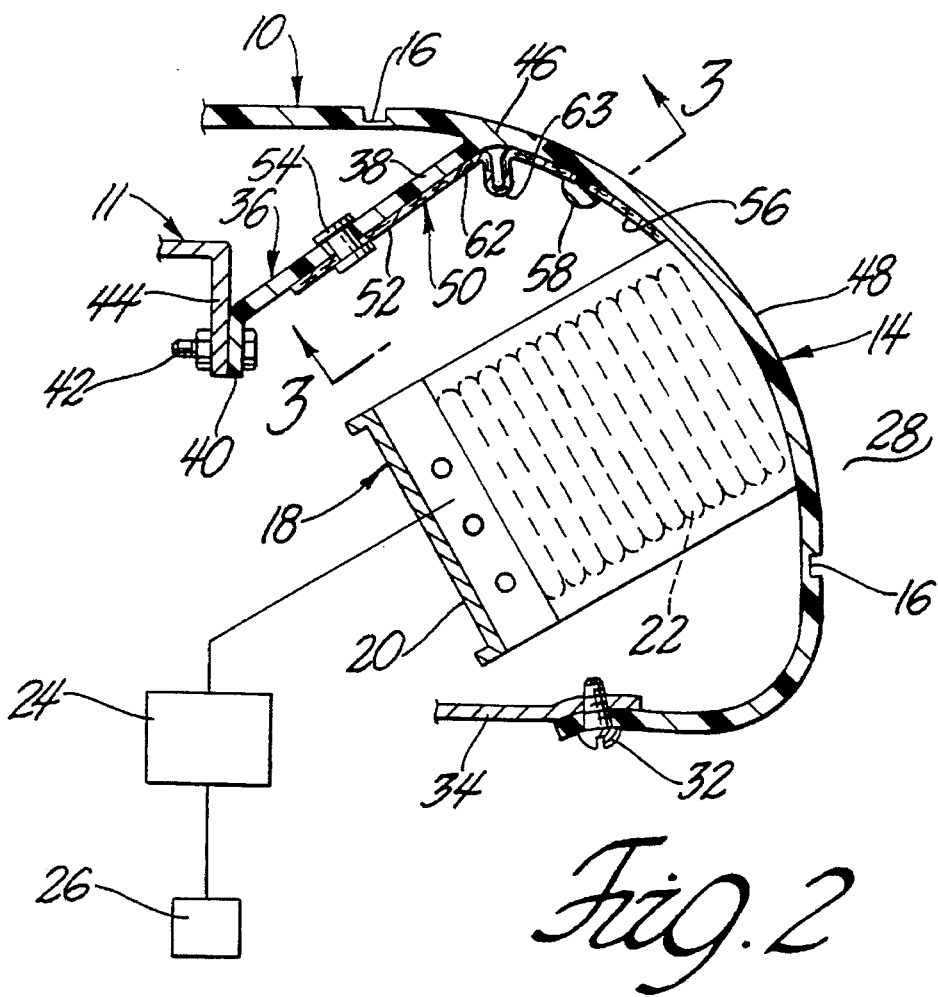
FIG. 2 is an enlarged view taken along the line 2—2 in FIG. 1 when looking in the direction of the arrows and includes a diagrammatic view of the air bag system.

Referring to FIGS. 1 and 2, there is illustrated a molded motor vehicle instrument panel 10 as installed in a motor vehicle structure generally designated as 11. The instrument panel 10 has an opening 12 on the driver side for the installation of an instrument cluster (not shown) and an air bag deployment door 14 of desired shape, in this case rectangular, on the passenger side whose entire or partial perimeter, in this case entire, is defined by a tear seam 16 molded in the instrument panel. The tear seam 16 may be formed by a groove either in the face of the panel as shown or by a similar groove in the back side of the panel to hide the tear seam from view as is well known in the art. The instrument panel covers an air bag system 18 that is located behind the instrument panel directly behind the air bag door 14 and is mounted on a sheet metal portion 20 of the vehicle structure. The air bag system 18 is of a conventional type that includes an inflatable air bag 22, an inflator 24 and an impact sensor 26 that on vehicle impact triggers ignition of the inflator to inflate the air bag for deployment into the passenger space 28 directly in front of a passenger seated on this side.

The instrument panel 10 is an injection molded one-piece part of generally uniform wall thickness and is formed of a suitable commercially available thermoplastic material such as polypropylene, polycarbonate, and styrene maleic anhydride that provides sufficient stiffness so that the panel is self-supporting to maintain the desired shape and has sufficient heat resistance to resist deformation due to heat in its interior vehicle environment where it is located immediately behind the windshield (not shown). The groove forming the tear seam 16 is made deep enough in relation to the wall thickness of the instrument panel and the strength of the plastic material so as to sufficiently weaken the wall section at the tear seam to the point that it is torn by the force of the inflating air bag acting against the back side of the air bag door and creates on its separation from the instrument panel an opening 30 therein for the deployment of the air bag as illustrated in FIG. 5 and described in more detail later.

The instrument panel 10 is fastened to portions of the vehicle structure 11 at various locations outside the area of the air bag door with one such location being shown in FIG. 2 wherein a sheet metal screw 32 fastens the panel at a lower edge thereof beneath the air bag door to a sheet metal portion 34 of the vehicle structure. And it will be understood that similar screws or other conventional type fasteners are used at other locations outside the area of the air bag door to securely fasten the instrument panel in place on the vehicle structure.

The air bag door 14 in the instrument panel 10 is separately fastened to the vehicle structure by an elongated mounting/hinge flange 36 that is molded integral with the back side of the door and extends horizontally along substantially the entire length and adjacent to the upper edge thereof as seen in FIGS. 1–3. The flange 36 has a flat portion 38 that extends inwardly of the door a substantial distance and terminates in a flat, angled, horizontally extending, distal portion 40 that is fastened along its length by bolts 42 to a sheet metal portion 44 of the vehicle structure. The flange 36 is also formed with a uniform thickness and acts as a cantilever hinge to normally provide for outward swinging opening movement of the door when the door is separated along the tear seam from the instrument panel for air bag deployment. Prior to such air bag door separation, the flange 36 acts to fasten the instrument panel to the vehicle structure at the air bag door and also provides support for the latter against a pushing force such as from a passenger which could otherwise push the door inward and separate the door from the instrument panel along the tear seam.

The flange 36 is designed to normally hinge and retain the air bag door 14 to the vehicle structure during its outward opening movement when the tear seam 16 is torn by the force of the inflating air bag and in doing so is highly stressed at its juncture 46 with the back side of the door as the flange portion 38 bends to effect swinging movement of the door. However, at very low or cold temperatures such as −20 degrees Fahrenheit and below, the typical commercially available plastics material suitable for the instrument panel in its primary application can become brittle to the point where the lower and major portion 48 of the door that is forced by the inflating air bag to bend outward about the horizontally extending juncture 46 of the door with the flange portion 38 may fracture or break off at this highly stressed zone (see FIG. 5) and be flung into the passenger compartment. This is prevented in a very cost effective manner by the strategic addition of an elongated flexible tethering hinge 50 that is formed from a sheet of strong flexible material that remains flexible or ductile at temperatures substantially below that at which the material of the instrument panel 10 becomes brittle. Examples of such material for the hinge 50 are thermoplastic materials such as polyvinyl chloride, coated nylon and Kevlar, thermosetting materials such as polyurethane and polyester, metal mesh screen, and a woven fabric of fibers formed of such plastic materials or natural fibers such as cotton or hemp.

The flexible tethering hinge 50 extends horizontally substantially the entire length of the mounting/hinge flange 36 (see FIG. 3) and is fastened along one horizontal margin 52 of the hinge 50 on one side of the critical juncture zone 46 to the flat portion 38 of the mounting/hinge flange at a location remote from this potential fracture zone by fastening means such as rivets 54. The tethering hinge 50 is fastened along another horizontal margin 56 parallel to the margin 52 and on the other side of this potential fracture zone to the inner side of the potentially frangible air bag door portion 48 by fastening means that can not be observed at the outer side of the door. For example, the latter fastening means can be hot staked bosses 58 that are provided on the inner side of the door as shown in FIGS. 2, 3 and 5 such as by being molded integral therewith or friction welded thereto or the hidden fastening means may be a suitable adhesive 60 as shown in FIG. 4. Examples of suitable adhesives for this purpose are polyurethanes and polyolefins. In the case of where rivets and bosses are used to fasten the tethering hinge at both its margins 52 and 56 respectively and where a woven fabric as above described is employed as the tethering hinge, both of the margins 52 and 56 preferably comprise one or more folds to provide increased strength at their points of attachment to the mounting/hinge flange 36 and the potential break away door portion 48. Where an adhesive is used to fasten the woven fabric tethering hinge to the door, only the margin 52 is preferably provided with one or more folds to reinforce its attachment by the rivets 54 or other suitable mechanical fasteners to the mounting/hinge flange 36.

The tethering hinge 50 has a portion 62 intermediate its margins 52 and 56 that spans the potential fracture zone 46 and flexes when door breakage occurs as illustrated in FIG. 5 to permit the broken door portion 48 to continue to swing outward to provide for air bag deployment while retaining the broken door portion to the vehicle structure. The intermediate portion 62 of the flexible tethering hinge 50 is preferably provided with an outward fold 63 in its installed condition as shown in FIG. 2 that unfolds as shown in FIG. 5 on the fracturing off of the door portion 48 from the mounting/hinge flange 36 to minimize the amount of stretching that is required of the tethering hinge between it attaching means 54 and 58 or 60 to allow deployment of the air bag while retaining the broken door portion to the vehicle structure.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. In combination, a motor vehicle structure, an air bag system including an inflatable air bag mounted on said vehicle structure, a molded instrument panel made of plastics material mounted on said vehicle structure and covering said air bag, said instrument panel having a tear seam defining an air bag deployment door in said instrument panel that is torn outward from said instrument panel along said tear seam by the force of said air bag on inflation to form an opening in said instrument panel allowing deployment of said air bag into a passenger space in said vehicle structure, said door having an integral elongated mounting/hinge flange located on an inner side, first fastening means fastening said mounting/hinge flange to said vehicle structure to normally aid in securing said instrument panel in place on said vehicle structure and supporting said door against an inward pushing force when said air bag is not being deployed, said mounting/hinge flange being flexible in a limited temperature range to act as a hinge to swing said door outward for air bag deployment while retaining said door to said vehicle structure but subject to breakage along a juncture zone with said door at temperatures below said limited temperature whereby a door portion is separated from said mounting/hinge flange and thereby from said vehicle structure, and a flexible tethering hinge for said door portion formed of flexible sheet material that remains flexible at temperatures substantially below said limited temperature range, said tethering hinge spanning said juncture zone and extending substantially the length thereof along an inner side of said door portion and one side of said mounting/hinge flange that adjoins said juncture zone, said tethering hinge having one margin that is located against said one side of said mounting/hinge flange at a location remote from said juncture zone and having another margin that is located against said inner side of said door portion and having an intermediate portion that is located between said margins and spans said juncture zone, second fastening means fastening said one margin to said mounting/hinge flange, third fastening means fastening said other margin to said door portion without penetrating said door portion, and said intermediate portion of said tethering hinge having a fold that extends along and outward of said juncture zone and unfolds to retain said door portion to said vehicle structure when said juncture zone breaks.

2. The combination set forth in claim 1 wherein said sheet material is a thermosetting material.

3. The combination set forth in claim 1 wherein said second fastening means comprises mechanical fasteners extending through said one margin at points spaced therealong, and said third fastening means comprises an adhesive.

4. The combination set forth in claim 1 wherein said second fastening means comprises mechanical fasteners extending through said one margin and said mounting/hinge flange that is connected to said vehicle structure, and said third fastening means comprises hot staked bosses on said inner side of said door portion.

5. The combination set forth in claim 1 wherein said sheet material is a thermoplastic material.

6. The combination set forth in claim 1 wherein said sheet material is a metal mesh screen.

7. The combination set forth in claim 1 wherein said sheet material is a woven fabric of plastic fibers.

8. The combination set forth in claim 1 wherein said sheet material is a woven fabric of natural fibers.

9. The combination set forth in claim 1 wherein said mounting/hinge flange extends substantially the length of said door, and said tethering hinge extends substantially the length of said mounting/hinge flange.

10. The combination set forth in claim 1 wherein said mounting/hinge flange extends substantially the length of said door, said tethering hinge extends substantially the length of said mounting/hinge flange, and said intermediate portion of said tethering hinge includes a fold located opposite said juncture zone.

* * * * *